United States Patent Office 3,350,390
Patented Oct. 31, 1967

3,350,390
2(1′CYCLOALKEN-1′-YL)-1-AZACYCLOALK-1-ENE COMPOUNDS AND PRODUCTION THEREOF
Siegfried Huenig, Hochberg, near Wurzburg, and Eberhard Luecke, Ludwigshafen (Rhine), Germany, assignors to Badische Anilin- & Soda-Fabrik Aktiengesellschaft, Ludwigshafen (Rhine), Germany
No Drawing. Filed Oct. 10, 1963, Ser. No. 315,366
Claims priority, application Germany, Oct. 13, 1962, B 69,220
11 Claims. (Cl. 260—239)

ABSTRACT OF THE DISCLOSURE

2′-hydroxy and 2′-sec. amino derivatives of 2-(1′-cycloalken-1′-yl)-1-azacycloalk-1-enes which are prepared by reacting a lactim sulfonic acid ester with an enamine of a cycloalkanone and a secondary or cyclic amine. The amine may be split off by hyrolysis to produce the corresponding enol which is tautomeric with corresponding keto-compound. The new compounds are useful as light-absorbing agents, stabilizers for polymers and polycondensates, and intermediates.

This invention relates to new heterocyclic cycloaliphatic compounds having the general formula:

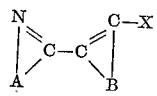

I and to processes for their production. In the above formula, A denotes an alkylene bridge having preferably from four to thirteen bridging groups, B denotes an alkylene bridge having preferably from three to thirteen bridging groups and X denotes a hydroxyl group or a secondary linear or cyclic amino or ammonium group.

It is an object of this invention to prepare substances which can be used as light-absorbing agents and as stabilizers for polymers and polycondensates. Another object of this invention is to provide a new class of compounds for important syntheses in the dyestuffs and pharmaceutical chemistries.

We have found that compounds having the formula I are obtained by reacting a lactim sulfonic acid ester having the general formula:

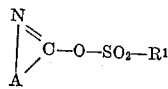

II in which R′ is an organic radical, for example an aliphatic, aromatic or araliphatic radical and A has the meaning given in Formula I with an enamine having the general formula:

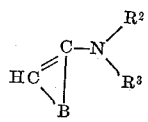

III in which $R^2$ and $R^3$ are aliphatic radicals which may also be combined to form a five-membered or six-membered ring system and B has the meaning given in Formula I and, if desired, converting the reaction product into the salts of the resultant amino compound formed or, by hydrolysis, into the corresponding hydroxyl compounds.

The lactim sulfonic acid esters (II) used in the practice of our invention are preferably those having six to fifteen ring members. The lactim sulfonic acid esters can be prepared by conventional methods by Beckmann rearrangement of oxime sulfonic acid esters or by sulfonylation of lactams. Aliphatic, araliphatic and aromatic sulfonic acid esters can be used. Sulfonic acid chlorides, for example the chlorides of benzene-sulfonic acid, toluene-sulfonic acids, methanesulfonic acid and β-naphthalene-sulfonic acid, are preferred for the production of the esters. The nature of the radical R′ is of minor significance for the process according to our invention.

The enamines (III) used are preferably those having from five to fifteen ring members in the ketone radical. They can be obtained by conventional methods from the corresponding cycloaliphatic ketones and secondary amines, preferably cyclic amines, such as pyrrolidine, piperidine or morpholine.

The new compounds (I) can be prepared in an advantageous way by reacting the lactim sulfonic acid ester, after its production and without isolation, with the enamine. The reaction media primarily used are anhydrous organic liquids, such as methylene chloride, ethylene chloride or chloroform. They are advantageously used in the presence of pyridine which stabilizes the lactim sulfonic acid esters.

If the lactim sulfonic acid ester (II) is prepared from oxime sulfonic acid ester by Beckmann rearrangement and to achieve the reaction according to our invention with the enamine is then achieved in the same reaction medium, the enamine may be present in the reaction medium before the Beckmann rearrangement is carried out.

In general, the reaction proceeds without difficulty in the temperature range of about 10° to about 40° C., preferably in the presence of at least 1 mole, and still better at least 2 moles of excess enamine as an auxiliary base. Stirring or agitation for several hours will assist efficient conversion. After adding a strong base, for example caustic soda solution, the free base can be isolated, for example by evaporating the solvent and subjecting the remaining base to high-vacuo distillation. Instead of the base, it is also possible to prepare a salt, for example the sulfonic acid salt, or the fluoborate obtained by reaction of the base for example with fluoboric acid.

Amines, such as are specified in Ber. 91 (1958), 380–392 and in German patent specification No. 1,132,135 may be used as auxiliary bases.

Hydrolysis is possible without isolating the base or salt, by acidifying the reaction medium with semi concentrated aqueous hydrochloric acid or acetic acid of about 75% strength. The compound (Ia) thus formed is in equilibrium of keto-enol tautomerism with the compounds (Ib) and (Ic):

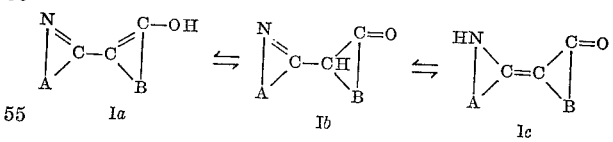

Ia        Ib        Ic

Since hydrolysis is to give the corresponding ketone, it can be carried out only under conditions which do not lead, or do not lead appreciably, to ring cleavage. Therefore, the hydrolyzing agent, the temperature and the duration of the hydrolysis must be so chosen relative to one another and in view of the stability of the ring (determined by its size), that the cyclic compound remains intact. Suitable conditions may easily be ascertained by optically evaluated preliminary experiments, because the different reaction products differ clearly in the ultraviolet spectrum.

Examples of lactim sulfonic acid esters (II) which are used in the practice of our invention are the benzenesulfonic acid esters derived from piperidone, caprolactam, capryllactam, and from the lactams of pelargonic acid, decane carboxylic acid or lauric acid.

Examples of enamines (III) which are used in the practice of our invention are: 1-pyrrolidinocyclopentene-(1), 1-piperidinocyclopentene-(1), 1-morpholinocyclopentene-(1), cyclohexene-(1), cycloheptene-(1), cyclooctene-(1), cyclononene-(1), cyclodecene-(1), cyclotridecene-(1) and cyclopentadecene-(1). The cyanine-type cations of the salts of compounds (I) wherein X denotes —N($R^2$)$_2$ are remarkable for their outstanding long wave ultraviolet absorption ($\lambda_{max}$ generally between 385 and 395 millimicrons in glacial acetic acid). The ultraviolet absorption of the heterocyclic cycloaliphatic iminoketones wherein X denotes OH in the Formulae Ib and Ic, is approximately at 340 millimicrons.

The heterocyclic cycloaliphatic compounds (I) are applicable as light-absorbing agents, stabilizers for polymers and polycondensates, and highgrade starting materials for production of dyes and pharmaceuticals.

Examples of the products obtained are:

1-morpholino-2-[2'-(1'-azacyclohepteno)]-cyclohexene-(1),
1-morpholino-2-[2'-(1'-azacyclohepteno)]-cyclooctene-(1),
1-morpholino-2-[2'(1'-azacyclohepteno)]-cyclononene-(1),
1-morpholino-2-[2'-(1'-azacyclohepteno)]-cyclodecene-(1),
1-morpholino-2-[2'-(1'-azacyclohepteno)]-cycloundecene-(1),
1-morpholino-2-[2'-(1'-azacyclohepteno)]-cyclododecene-(1),
1-morpholino-2-[2'-(1'-azacyclohepteno)]-cyclotridecene-(1),
1-morpholino-2-[2'-(1'-azacyclooocteno)]-cyclohexene-(1),
2-(2'-azacyclooctylidene)-cyclohexanone,
1-morpholino-2[2'-(1'-azacyclononeno)]-cyclohexene-(1),
2-(2'-azacyclononylidene)-cyclohexanone,
1-morpholino-2-[2'-(1'-azacyclotrideceno)]-cyclohexene-(1),
2-(2'-azacyclotridecylidene)-cyclohexanone,
2-(2'-azacycloheptylidene)-cyclohexanone,
2-(2'-azacycloheptenylidene)-cyclooctanone,
2-(2'-azacycloheptylidene)-cyclododecanone,
2-(2'-azacycloheptylidene)-cycloheptanone and
2-(2'-azacycloheptylidene)-cyclopentanone.

For the achievement of optimum yields it is advantageous to use for the production of the heterocyclic cycloaliphatic compounds where possible carefully dried initial compounds and anhydrous organic solvents.

The invention is further illustrated by the following examples.

EXAMPLE 1

11.4 g. of cyclohexanone oxime (0.1 mole) and 16 ml. of pyridine (0.2 mole) are dissolved in 50 ml. of methylene chloride, the solution is cooled to −15° C. and 14 ml. of benzenesulfonic acid chloride (0.11 mole) is allowed to drip in within thirty minutes at such a rate that the temperature does not rise above −10° C. The temperature of the reaction mixture is then allowed to slowly rise to 20° C., 50 g. of 1-morpholinocyclohexene-(1) is added within twenty minutes and the mixture is stirred for forty hours at room temperature. It is shaken twice with ice-cold 2 N caustic soda solution, the organic phase is dried over potassium carbonate and distilled under subatmospheric pressure, 11.4 g. of an orange red and well crystallizing (53% of the theory) oil distilling over at a temperature of 138° to 145° C. and a pressure of 0.2 mm. Hg. By recrystallization from petroleum ether and ether colorless prisms with the melting point 102° to 103° C. are obtained. Quantitative analysis confirms the empirical formula $C_{16}H_{26}N_2O$ of 1-morpholino-2-[2'-(1'-azacycloheptneo)]-cyclohexene-(1). $\lambda_{max}$(n-hexane) 230 millimicrons; $\epsilon_{max}$ 6.45·10$^3$.

To prepare the hydrofluoborate, the bicyclic base is dissolved in absolute ether and to this solution ethereal fluoboric acid is added until no further precipitate forms at the point where the drops meet the solution. The egg-yolk yellow precipitate obtained crystallizes upon prolonged standing. It is filtered by suction away from moisture and washed several times with absolute ether. Quantitative analysis confirms the empirical formula $$C_{16}H_{27}N_2OBF_4$$

of the hydrofluoborate, $\lambda_{max}$ (methylene chloride) 390 millimicrons; $\epsilon_{max}$ 22.2×10$^3$; $\lambda_{max}$ (methanol) 385 millimicrons; $\epsilon_{max}$ 22.4×10$^3$.

EXAMPLE 2

By following the procedure of Example 1 but using 58.5 g. (0.3 mole) of 1-morpholinocyclooctene-(1) instead of the cyclohexene derivative, 16.6 g. (57% of the theory) of an orange red highly viscous oil which distills over at 144° to 150° C. at 0.008 mm. Hg is obtained; $\lambda_{max}$ (methanol+glacial acetic acid 9:1) 393 millimicrons; $\epsilon_{max}$ 22.3×10$^3$. The equivalent weight determined by titration with 0.1 N perchloric acid is 291, that calculated for 1-morpholino-2-2'-(1'-azacycloheptneo)-cyclooctene-(1) being 290 ($C_{18}H_{30}N_2O$).

EXAMPLE 3

By following the procedure of Example 1 and using 61.8 g. (0.3 mole) of 1-morpholinocyclononene-(1), 9.7 g. (43% of the theory) of an orange red oil is obtained which distills over at 125° to 135° C. at 0.02 mm. Hg. The equivalent weight determined by titration with 0.1 N perchloric acid is 330, that calculated for 1-morpholino-2-[2'-(1'-azacycloheptneo)]-cyclononene-(1) being 304 ($C_{19}H_{32}N_2O$).

EXAMPLE 4

By following the procedure of Example 1 and using 66.0 g. (0.3 mole) of 1-morpholinocyclodecene-(1) 12 g. (38% of the theory) of a viscous oil distilling over at 148° to 156° C. at 0.02 mm. Hg is obtained which crystallizes upon prolonged standing. By recrystallization from n-hexane pale yellow prisms with the melting point 117° to 118° C. are obtained; $\lambda_{max}$ (methanol+glacial acetic acid 9:1) 395 millimicrons, $\epsilon_{max}$ 19.0×10$^3$. The equivalent weight determined by titration with 0.1 N perchloric acid is 318, that calaculated for 1-morpholino-2-[2'-(1'-azacycloheptneo)]-cyclodecene-(1) being 318

$$(C_{20}H_{34}N_2O)$$

EXAMPLE 5

Following the procedure of Example 1 and using 0.57 g. (0.005 mole) of cyclohexanone oxime, 0.8 ml. (0.01 mole) of pyridine, 2.5 ml. of methylene chloride, 0.7 g (0.0055 mole) of benzenesulfonic acid chloride and 1.2 g. (0.005 mole) of 1-morpholinocycloundecene-(1), 1.09 g. (66% of the theory) of a viscous yellow oil which distills over at 110° to 130° C. at 0.4 mm. Hg is obtained. A sample, after having been fractionated again under mild conditions and measured immediately following fractionation, gave $\lambda_{max}$ (methanol+glacial acetic acid 9:1) 395 millimicrons, $\epsilon_{max}$ 22.0×10$^3$. The equivalent weight determined by titration with 0.1 N perchloric acid is 333, that calculated for 1-morpholino-2-[2'-(1'-azacycloheptneo)]cycloundecene-(1) being 332 ($C_{21}H_{36}N_2O$).

EXAMPLE 6

By following the procedure of Example 1 and using 75.3 g. of 1-morpholinocyclododecene-(1), 18.1 g. (52% of the theory) of a viscous oil which distills over at 139° to 160° C. at 0.004 mm. Hg is obtained: $\lambda_{max}$ (methanol+glacial acetic acid 9:1) 395 millimicrons, $\epsilon_{max}$ 21.9×10$^3$. Upon prolonged standing, the molar extinction falls to about 18,000 while the equivalent weight remains unchanged. The equivalent weight determined by titration with 0.1 N perchloric acid is 344, that calculated for 1-morpholino-2-[2'-(1'-azacyclohepteno)]-cyclododecene-(1) being 346 ($C_{22}H_{38}N_2O$).

EXAMPLE 7

By following the procedure of Example 1 and using 69.5 g. (0.3 mole) of 1-morpholinocyclotridecene-(1), 19.4 g. (54% of the theory) of a yellow oil which distills over at 133° to 155° C. at 0.007 mm. Hg is obtained; $\lambda_{max}$ (methanol+glacial acetic acid 9:1) 395 millimicrons, $\epsilon_{max}$ 22.2×10³. The equivalent weight determined by titration with 0.1 N hydrochloric acid is 363, that calculated for 1-morpholino-2-[2'-(1'-azacyclohepteno)]-cyclotridecene-(1) being 360 ($C_{23}H_{40}N_2O$).

EXAMPLE 8

12.7 g. (0.1 mole) of cycloheptanone oxime and 16 ml. (0.2 mole) of pyridine which has been dried over calcium hydride are dissolved in 50 ml. of ethylene chloride which has been dried over calcium chloride. The solution is then cooled to −10° C. and 14 ml. (0.11 mole) of benzenesulfonic acid chloride is added. The reaction solution is stirred for another thirty minutes at low temperature and the cooling bath is then removed. The colorless reaction mixture warms up and becomes intense yellow orange. After a clear solution has formed, stirring is continued for another thirty minutes. Then 50 g. (0.3 mole) of 1-morpholino-cyclohexene-(1) is added and the solution formed which has an intensely red coloration is stirred for several hours at room temperature.

50 ml. of a 1:1 mixture of glacial acetic acid and water is added to this solution which contains 1-morpholino-2-[2'-(1'-azacyclooncteno)]-cyclohexene-(1). After stirring the solution for five hours at room temperature, 150 ml. of concentrated ammonia is added, the organic phase is stripped from the aqueous phase, the aqueous phase is extracted twice with ethylene chloride, the combined organic phases are washed with water and distilled under subatmospheric pressure. At 120° to 122° C. at 0.2 mm. Hg, 11.8 g. (57% of the theory) of 2-(2'-azacyclooctylidene)-cyclohexanone is obtained as a yellow oil which crystallizes upon prolonged standing.

EXAMPLE 9

By following the procedure of Example 8 and using 14.1 g. (0.1 mole) of cyclooctanone oxime, 16 ml. of pyridine, 14 ml. of benzenesulfonic acid chloride and 50 g. of 1-morpholinocyclohexene-(1) a solution having a deep brown color is obtained which contains 1-morpholino-2-[2'-(1'-azacyclononeno)]-cyclohexene.

Hydrolysis yields 4.7 g. (37% of the theory) of 2-(2'-azacyclononylidene)-cyclohexanone as a yellow oil which gradually crystallizes.

EXAMPLE 10

From 19.7 g. (0.1 mole) of cyclododecanone oxime, 16 ml. of pyridine, 14 ml. of benzenesulfonic acid chloride and 50 g. of 1-morpholinocyclohexene-(1), a solution of 1-morpholino-2-[2'-(1'-azacyclotrideceno)]-cyclohexene-(1) is obtained which gives 9.7 g. (35% of the theory) of 2-(2'-azacyclodecylidine)-cyclohexanone as a viscous oil after hydrolysis and distillation at 165° C. at 0.2 mm. Hg.

EXAMPLE 11

75 ml. of about 26% hydrochloric acid is added at room temperature with vigorous stirring to the reaction feed obtained according to Example 1 after adding the 1-morpholinocyclohexene-(1) and stirring for several hours. Stirring is continued for five hours and then the organic phase is stripped, shaken five times, each time with 25 ml. of water, the combined aqueous extracts to which 25 ml. of chloroform is added, are continuously neutralized with solid sodium carbonate, shaken three times, each time with 25 ml. of chloroform and the organic extracts are distilled at 136° to 137° C. at 0.2 mm. Hg, 7.9 g. (37% of the theory) of a pale yellow oil which crystallizes being obtained. Recrystallization from petroleum ether or ether gives colorless prisms with the melting point 58° to 59° C. The equivalent weight determined by filtration with 0.1 N perchloric acid is 192, that calculated for 2-(2'-azacycloheptylidene)-cyclohexanone ($C_{12}H_{19}NO$) being 193.

In an analogous manner, by using the reaction feed according to Example 2, 2-(2'-azacycloheptylidene)-cyclooctanone is obtained, while 2-(2'-azacycloheptylidene)-cyclododecanone is obtained from the reaction feed according to Example 6.

Some of the properties of these compounds are given in the following table, the sequence of the compounds being as above:

| Melting point, °C. | Equivalent weight (0.1 N perchloric acid) | | $\lambda_{max.}$ (methanol) millimicrons | $\epsilon_{max.}$ |
| --- | --- | --- | --- | --- |
| | Calculated | Found | | |
| 58–60 | 207 | 207 | 335 | 18.7×10³ |
| 83–85 | 221 | -------- | 340 | 19.1×10³ |
| 93–95 | 277 | 278 | 335 | 19.2×10³ |
| | 176 | 176 | | |

The heterocyclic cycloaliphatic ketones can also be obtained by dissolving the isolated heterocyclic cycloaliphatic bases or salts for example in acetone and allowing 100 ml. of a mixture of 2 N acetic acid and acetone (1:1) or of 2 N hydrochloric acid and acetone (1:1) to drip in. The hydrolysis period is about three to thirty hours depending on the temperature, which is usually chosen within the range of 10° to 80° C., preferably 20° to 50° C. Other concentrations of the hydrolyzing agents and other acids, such as sulfuric acid and chloroacetic acid, may also be used.

If 1-morpholino-2-[2'-(1'-azacyclohepteno)]-cycloheptene-(1) and 1-morpholino-2-[2'-(1'-azacyclohepteno)]-cyclopentene-(1) are synthesized by the method described in Example 1, 2-(2'-azacycloheptylidene)-cycloheptanone and 2-(2'-azacycloheptylidene)-cyclopentanone, respectively, are obtained therefrom by hydrolysis by the method described in Example 11.

We claim:
1. Heterocyclic cycloaliphatic compounds having the formula

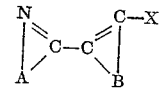

in which A and B are alkylene bridges having 5 to 11 methylene groups and X is a hydroxyl, morpholino, piperidino or pyrrolidino group.
2. 2-(2'-azacycloheptylidene)-cyclohexanone.
3. 2-(2'-azacycloheptylidene)-cyclooctanone.
4. 2-(2'-azacycloheptylidene)-cyclododecanone.
5. 2-(2'-azacyclooctylidene)-cyclohexanone.
6. 2-(2'-azacyclononylidene)-cyclohexanone.
7. 2-(2'-azacyclotridecylidene)-cyclohexanone.
8. A process for the production of heterocyclic cycloaliphatic compounds

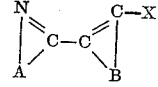

in which A and B are alkylene bridges having 5 to 11 methylene groups and X is a morpholino, piperidino or pyrrolidino group which comprises reacting a lactim sulfonic acid ester having the formula

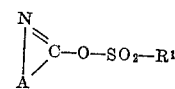

in which R¹ is an aliphatic, aromatic or araliphatic radical, with an enamine having the formula

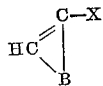

in which X is a morpholino, piperidino or pyrrolidino group.

9. A process as claimed in claim 8 wherein an equimolar amount of a tertiary amine is co-employed.

10. A process as claimed in claim 8 wherein the reaction is carried out in an anhydrous organic solvent.

11. A process for production of heterocyclic cycloaliphatic compounds of the formula

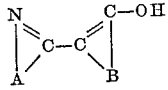

which comprises reacting a lactim sulfonic acid ester having the formula

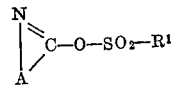

in which R¹ is an aliphatic, aromatic or araliphatic radical, with an enamine having the formula

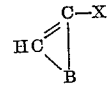

in which X is a morpholino, piperidino or pyrrolidino group, and hydrolyzing the resultant compound or a salt thereof by acidification thereof.

No references cited.

ALTON D. ROLLINS, *Primary Examiner.*